UNITED STATES PATENT OFFICE.

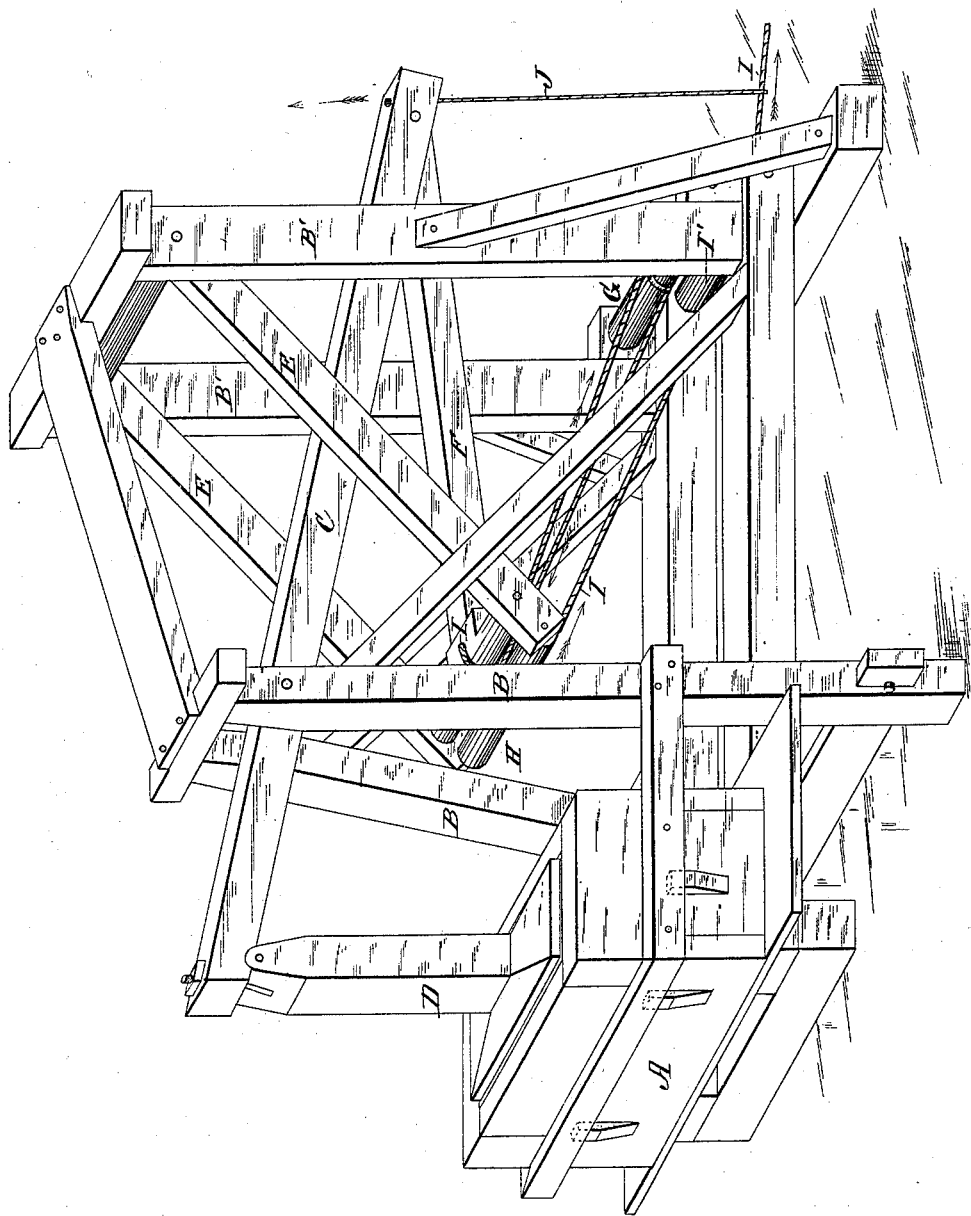

THOMAS G. HOLLOWAY, OF BOSTON, GEORGIA, ASSIGNOR OF ONE-HALF TO ALVA G. STEELE.

BALING-PRESS.

SPECIFICATION forming part of Letters Patent No. 285,621, dated September 25, 1883.

Application filed March 21, 1883. (No model.)

*To all whom it may concern:*

Be it known that I, THOMAS G. HOLLOWAY, of Boston, in the county of Thomas and State of Georgia, have invented a new and useful Improvement in Cotton-Presses, of which the following is a full, clear, and exact description, reference being had to the annexed drawing, forming part of this specification.

The object of this invention is to provide a power-lever for cotton-presses; and the invention consists of a combination of levers and tackle for operating them, as hereinafter described.

The drawing is a perspective view of my improved cotton-press, showing the arrangement of the several parts.

A indicates the baling-box, which is formed in sections, having tenons and mortises for holding them together, and supported upon a suitable platform. The platform is connected to a frame composed of uprights B B', provided with braces and cross-bars for supporting them in proper position. Between the two uprights B is pivoted the lever C, to the short end of which is pivoted the follower-beam D. Between the two uprights B' are pivoted two levers, E, which are connected together by cross-rods at the ends. The levers E are pivoted to the uprights in such manner that they may be oscillated between said uprights, and they are connected near their free ends to the long end of lever C by an arm, F, which forms a flexible joint with each.

With this construction, when the free ends of levers E are drawn downward, the arm F is made to oscillate upon its end connected with said levers in such manner as to cause its other or opposite end to move up between the levers and elevate the free end of the lever C. The levers E and arm F thus serve as a pendant-supported prop for the lever C, and differ from an ordinary toggle-lever in that their unconnected ends are located approximately near each other, and the leverage is applied by causing these ends to approach each other by moving the connected ends of E and F through one and the same arc, whose radius may be several times greater than the distance between the said unconnected ends. An immense advantage is thus gained over any toggle-lever whose unconnected ends are extended from each other.

Power is to be applied to the levers E by means of a rope, I, attached to the lower end of the arm F, and carried over a roller, G, and back and over a roller, H, at the lower end of the levers E, and from this roller to a roller, I', arranged below the roller G. The follower is to be lifted by a rope, J, secured to the rear end of the lever C.

What I claim is—

1. The combination, with the press-lever C, of a pendant pivoted in a suitable supporting-frame, and a prop flexibly connected to the pendant and adapted to be drawn under the lever by the oscillation of the pendant, substantially as shown and described.

2. The combination, with the lever C, of the pendent levers E and the arm or prop F, pivoted between said levers at their free ends and flexibly jointed to the free end of lever C, substantially as shown and described, the connected ends of levers E and arm F being adapted to swing in one and the same arc, as and for the purpose specified.

THOMAS G. HOLLOWAY.

Witnesses:
D. C. CLARK,
T. T. STEPHENS.